(12) United States Patent
Eaton (10) Patent No.: US 7,639,347 B2
(45) Date of Patent: Dec. 29, 2009

(54) HIGH-SPEED LASER RANGING SYSTEM INCLUDING A FIBER LASER

(75) Inventor: Robert B. Eaton, Littleton, MA (US)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/675,059

(22) Filed: Feb. 14, 2007

(65) Prior Publication Data

US 2008/0192228 A1 Aug. 14, 2008

(51) Int. Cl.
*G01C 3/08* (2006.01)

(52) U.S. Cl. .................. 356/5.1; 356/4.01; 356/4.1; 356/5.01

(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 3,456,211 A | 7/1969 | Koester | |
| 4,234,141 A | 11/1980 | Miller et al. | |
| 4,515,431 A | 5/1985 | Shaw et al. | |
| 4,685,107 A | 8/1987 | Kafka et al. | |
| 4,835,778 A | 5/1989 | Kafka et al. | |
| 5,513,194 A | 4/1996 | Tamura et al. | |
| 5,606,413 A | 2/1997 | Bellus et al. | |
| 5,793,034 A | 8/1998 | Wesolowicz et al. | |
| 5,835,199 A * | 11/1998 | Phillips et al. | 356/5.03 |
| 6,023,322 A | 2/2000 | Bamberger | |
| 6,081,369 A * | 6/2000 | Waarts et al. | 359/341.33 |
| 6,347,007 B1 * | 2/2002 | Grubb et al. | 359/337.21 |
| 6,404,494 B1 * | 6/2002 | Masonis et al. | 356/338 |

(Continued)

FOREIGN PATENT DOCUMENTS

CA 2446909 12/2002

(Continued)

OTHER PUBLICATIONS

Abshire, James B., Sun, Xiaoli, and Krainak, Michael A., *Laser Altimetry Using Pseudo-Noise Code Modulated Fiber Lasers and Photon Counting Detectors*, NASA—Goddard Space Flight Center, Laboratory for Terrestrial Physics, Mail Code 920, Greenbelt, Md 20771, (301) 614-6081, 2005 Quantum Electronics and Laser Science Conference (QELS) pp. 1991-1993.

(Continued)

*Primary Examiner*—Thomas H Tarcza
*Assistant Examiner*—Luke D Ratcliffe
(74) *Attorney, Agent, or Firm*—Workman Nydegger (57) ABSTRACT

Apparatuses and methods for gathering data describing a surface are disclosed. The apparatuses transmit pulses of light at a high rate using one or more fiber lasers. Examples of such apparatuses include laser ranging systems, such as light detection and ranging (LIDAR) systems, and laser scanners. Data received from the apparatus by a data processing unit can be used to create a data model, such as a point cloud, digital surface model or digital terrain model describing the surface. The surface can be the surface of terrain and/or objects, for example. Use of the fiber laser results in many advantages, such as improved vertical surface discrimination, increased pulse rate, safety benefits, as well as other advantages.

42 Claims, 2 Drawing Sheets

U.S. PATENT DOCUMENTS

| | | | |
|---|---|---|---|
| 6,664,529 | B2 * | 12/2003 | Pack et al. ............... 250/208.1 |
| 6,734,849 | B2 | 5/2004 | Dimsdale et al. |
| 6,746,078 | B2 | 6/2004 | Breed |
| 6,876,441 | B2 | 4/2005 | Barker |
| 6,963,354 | B1 * | 11/2005 | Scheps ........................ 348/31 |
| 2002/0059042 | A1 * | 5/2002 | Kacyra et al. ............... 702/152 |
| 2002/0060784 | A1 | 5/2002 | Pack et al. |
| 2004/0130702 | A1 | 7/2004 | Jupp et al. |
| 2004/0236535 | A1 | 11/2004 | Hyyppa et al. |
| 2005/0151965 | A1 * | 7/2005 | Bissett et al. ............... 356/328 |
| 2006/0238742 | A1 | 10/2006 | Hunt et al. |
| 2008/0094605 | A1 * | 4/2008 | Drodofsky et al. ......... 356/4.01 |

FOREIGN PATENT DOCUMENTS

| | | |
|---|---|---|
| EP | 1405096 | 4/2004 |
| JP | 2004/527765 T | 9/2004 |
| WO | WO 01/31290 | 5/2001 |
| WO | 02097367 | 12/2002 |

OTHER PUBLICATIONS

Defense Advanced Research Projects Agency (DARPA) Proposal Request SB052-027, *Wavelength Conversion of Pulsed Fiber Lasers*, Accessed Oct. 27, 2006 (Available at http://www.dodsbir.net/solicitation/sbir052/darpa052.doc).

Hughes E. J. et al., "Medium PRF Radar PRF Optimization Using Evolutionary Algorithms," Proceedings of the 2003 IEEE Radar Conference, Huntsville, Alabama, (May 5-8, 2003), IEEE Radar Conference, New York, New York: IEEE, US, (May 5, 2003), pp. 192-202.

U.S. Appl. No. 11/397,246, Mail Date Sep. 14, 2007, Office Action.
U.S. Appl. No. 11/397,246, Mail Date Mar. 25, 2008, Office Action.

* cited by examiner

HIGH-SPEED LASER RANGING SYSTEM INCLUDING A FIBER LASER

CROSS-REFERENCE TO RELATED APPLICATIONS

Not applicable

BACKGROUND

Light emitting devices, such as lasers, have been used as a sensor component to gather information in various applications. For example, time of flight measurement apparatuses, such as laser scanners and light detection and ranging apparatuses (hereinafter referred to as "LIDAR"), have been used for many applications. Examples of such applications include terrain mapping, bathymetry, seismology, detecting faults, biomass measurement, wind speed measurement, Differential Absorption LIDAR (DIAL), temperature calculation, traffic speed measurement, object identification, high definition surveying, close range photogrammetry, atmospheric composition, meteorology, distance measurement, as well as many other applications.

LIDAR has been increasingly used for surveying and topographical mapping of geographical areas, for example, using downward-looking LIDAR instruments mounted on aerial platforms, such as aircraft or satellites. Such LIDAR instruments are used to determine distances to a surface, such as a surface of an object or a terrain surface, using pulses of light. The range to the surface is determined by measuring the time delay between transmission of a pulse of light and detection of a corresponding reflection signal. In such systems, speed of light is used as a known constant for calculating the distance using the time of light travel.

The location of a surface can be calculated based on: (1) the angle with respect to the system at which the pulse of light is transmitted, (2) the orientation of the system with respect to the earth and (3) the current location of the system. As the measurements progress, data from rapid laser firings, often numbering in the millions, can be captured and additional data models describing the reflecting surface can be recorded.

There remains a need, however, for improved range finding apparatuses, such as LIDAR apparatuses for use on aerial platforms, having improved performance characteristics and improved safety characteristics.

BRIEF SUMMARY OF SEVERAL EXAMPLE EMBODIMENTS

A laser ranging system is disclosed. The laser ranging system includes at least one fiber laser configured to transmit pulses of light to a surface at a rate of at least 20,000 pulses of light per second. Each fiber laser includes an optical fiber as an active gain region, wherein the active gain region includes a rare-earth doped element. The laser ranging system further includes laser control circuitry, wherein the laser control circuitry is configured to cause the at least one fiber laser to transmit pulses of light at the rate of at least 20,000 pulses of light per second. The laser ranging system further includes an optical receiver configured to receive return signals representing portions of the transmitted pulses of light reflected from the surface. The laser ranging system further includes elapsed time circuitry configured to measure an elapsed time between transmission of the pulses of light by the fiber laser and reception of the return signals. The laser ranging system further includes a position measurement unit configured to acquire position information describing the position of the laser ranging system. The laser ranging system further includes an inertial measurement unit configured to acquire pitch, roll, and heading information describing movement of the laser ranging system. The laser ranging system further includes a scanning subassembly configured to direct the pulses of light transmitted by the fiber laser at different scan angles.

A LIDAR system is disclosed that includes a fiber laser configured to transmit pulses of light to a surface, each pulse of light having a pulse width of five nanoseconds or less. The LIDAR system further includes laser control circuitry. The laser control circuitry is configured to cause the fiber laser to transmit the pulses of light with a pulse width of five nanoseconds or less. The LIDAR system further includes an optical receiver configured to receive return signals reflected from the surface. The LIDAR system further includes circuitry configured to distinguish between return signals corresponding to a single transmitted pulse of light. The LIDAR system further includes elapsed time circuitry configured to measure an elapsed time between transmission of the pulses of light by the fiber laser and reception of the return signals. The LIDAR system further includes circuitry configured to calculate a distance based at least in part on the elapsed time, wherein the distance calculation has a precision of about ten centimeters or less. The LIDAR system further includes a position measurement unit configured to acquire information describing a position of the LIDAR system. The LIDAR system further includes an orientation measurement unit configured to acquire information describing a pitch, roll, and heading of the LIDAR system. The LIDAR system further includes a scanning subassembly configured to direct the pulses of light transmitted by the fiber laser at different scan angles.

A method for acquiring data describing one or more surfaces is disclosed. The method includes transmitting pulses of light from at least one fiber laser at a rate of at least 20,000 pulses of light per second. The method further includes for each transmitted pulse of light, receiving at least one return signal. The method further includes for each return signal, determining a time of flight of the corresponding pulse of light based at least in part on an elapsed time between the transmission of the each pulse of light and reception of the corresponding return signal. The method further includes calculating distances between the fiber laser and the one or more surfaces. The method further includes receiving a signal associated with a position of the fiber laser, receiving a signal associated with changes in attitude of the fiber laser, and generating a three dimensional digital data model using at least the time of flight determined for each return signal, wherein the three dimensional digital data model.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only example embodiments and are therefore not to be considered limiting of the scope of the invention. The example embodiments will be described and explained with additional specificity and detail through the use of the accompanying drawings in which.

DETAILED DESCRIPTION OF SEVERAL EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale.

Embodiments disclosed herein relate to collecting large amounts of range data using a fiber laser on an aerial platform. A fiber laser is an optically pumped, solid-state laser in which an optical fiber is the active laser medium. The core of the fiber is doped, usually with one of the standard rare earth ions, such as neodymium (Nd), ytterbium (Yb), or erbium (Er). The high degree of confinement of the optical (electromagnetic) fields within the core of the fiber laser and the long interaction distance in the fiber have been discovered to provide particularly excellent operational characteristics for rangefinding apparatuses, such as LIDAR systems.

Use of a fiber laser for gathering range data can result in many advantages over conventional rangefinders using various other types of lasers. Use of a fiber laser can result in a consistent pulse shape regardless of the pulse rate and higher pulse rates. For example, the shape of pulses generated by a fiber laser generating 20,000 pulses per second is substantially similar to the shape of pulses generated by the same fiber laser generating pulses at 100,000 pulses or more per second. Further, the shape of pulses generated by a fiber laser generating 3,000 pulses per second is substantially similar to the shape of pulses generated by the same fiber laser generating pulses at 150,000 pulses or more per second. Thus the previously required compensation for variations of pulse shape over different pulse rates may be eliminated. Previously used lasers create pulses having relatively wider and more poorly shaped waveforms as the rate of pulse generation is increased. Consistent pulse shape improves timing, which may be necessary for identifying a return signal. Fiber lasers can also produce higher optical power output for each pulse. Therefore, embodiments disclosed herein may allow for a wide range of different wavelengths of optical pulse generation in high speed rangefinding applications.

In addition, a rangefinder that includes a fiber laser for pulse generation can have improved vertical discrimination. Vertical discrimination can relate to the ability of a rangefinding device to distinguish multiple pulse return signals. The multiple pulse return signals may be a result of multiple surfaces from which a single transmitted pulse is reflected thereby identifying additional surfaces. For example, in high speed acquisition of data describing terrain, a first return signal may relate to a distance to a first surface, such as a roof of a house, and a second return signal may relate to a distance to a second surface, such as a ground surface located below the roof of the house. According to several embodiments, use of a fiber laser can increase vertical discrimination to about 3.5 meters or less. Thus, the amount of data recorded for a single transmitted pulse of light can be increased because additional vertically discernable points can be identified and subsequently recorded.

Rangefinding pulses generated by a fiber laser at a high rate can have a narrow pulse width relative to previously implemented lasers. For example, the pulse width of a rangefinding pulse generated by a fiber laser can have a pulse width of less than ten nanoseconds. More preferably, the pulse width of a rangefinding pulse generated by a fiber laser can have a pulse width of about 5 nanoseconds or less. In some embodiments, the rangefinding pulse generated by a fiber laser can have a pulse width of 1 nanosecond or less. Having such reduced pulse widths of generated pulses enables increased vertical discrimination because the spacing between pulses can be increased, and/or the rate of pulse transmission can be increased while the ability to distinguish between pulses is retained.

As a result of the reduced pulse width, additional benefits of improved pulse signal shape, increased optical power, and increased time between signals can further improve the ability of the discrimination circuitry to distinguish between multiple pulse return signals. Higher optical power output also enables longer distances for rangefinding. As a result, an aerial platform supporting the rangefinder implementing the fiber laser may be used at higher altitudes.

Circuitry can be implemented for identifying multiple portions of a pulse reflected from a surface. For example, a constant fraction discriminator (CFD) can be used in high speed rangefinding devices to distinguish multiple pulse return signals. CFDs are electronic signal processing devices, designed to approximate the mathematical operation of finding the time at which a maximum intensity of a pulse occurs. In high speed applications, a fiber laser generating pulses of light having the reduced pulse widths disclosed above improves the ability of discrimination circuitry to distinguish the multiple pulse return signals resulting in improved vertical discrimination.

Use of fiber lasers for high-speed rangefinding devices can also have many advantages with regard to safety. For example, despite a potential for greater optical power output, use of a fiber laser instead of other types of lasers can enhance eye-safety. When using other types of lasers in prior rangefinding apparatuses, attenuators operated on the emitted beam as an alternative to reducing optical power within the laser apparatus itself because reducing the optical power would result in undesired effects to the shape of the optical pulse. However, eye-safety can be improved because output energy of a fiber laser can be throttled—that is, the gain can be increased and decreased—without materially affecting the shape of the pulse. The reduced pulse width and frequency of transmission of optical pulses generated by a fiber laser in rapid succession can increase the eye-safety of the rangefinding device. For example, energy of an optical pulse may be represented by a plot of time versus power of the optical pulse. The total energy of an optical pulse, for example the area under the curve representing a single pulse, typically relates to the potential for the optical pulse to damage an eye. Thus, as the width of an optical pulse is reduced, the energy of the optical pulse is also reduced. As a result, the eye-safety risk of a single optical pulse can be reduced.

In addition, a wavelength of the optical pulse of the fiber laser can also be changed without significantly affecting the optical pulse shape. As such, a wavelength may be used that ultimately improves eye-safety. For example, a wavelength such as between about 1.3 and 1.8 micron may be used, which improves eye-safety of the rangefinder. More specifically, a fiber laser producing a pulse of light having a wavelength between about 1.5 and 1.7 micron can be used. More specifically, pulses of light having a wavelength between about 1.535 and 1.545 micron can be generated. Other wavelengths of light can be generated by the fiber laser.

Fiber lasers may also have a better current transfer ratio (also referred to as wall-plug efficiency). The current transfer ratio is a the ratio of electrical energy input to a device to the optical energy output by the device. Therefore, by using a fiber laser, as opposed to another type of laser used in previous systems, a better current transfer ratio can result in better efficiency of the laser scanning device.

Figure 1:
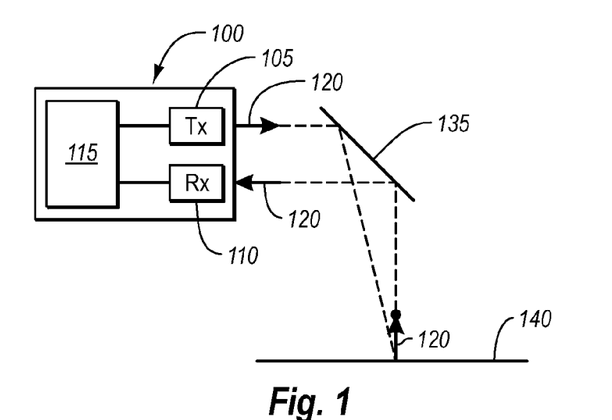
FIG. 1 illustrates a time of flight measurement apparatus according to an example embodiment.

Referring to FIG. 1, a time of flight measurement apparatus 100, such as a laser scanning or LIDAR system, is illustrated. The time of flight measurement apparatus 100 includes a fiber laser 105 (which may be diode pumped), and an optical receiver 110, such as a photodiode. The fiber laser 105 and optical receiver 110 are electrically coupled to circuitry 115. A pulse of light 120 is emitted by the fiber laser 105, reflected off of a surface 140, and at least a reflected portion of the transmitted pulse of light 120 (also referred to as a "return signal") is received by the optical receiver 110 as shown in FIG. 1.

The circuitry 115 can include elapsed time circuitry configured to measure an elapsed time between transmission of the pulse of light 120 by the fiber laser 105 and reception of a reflected portion of the pulse of light 120 by the optical receiver 110. The circuitry 115 can further include a data processing device configured to calculate a distance traveled by the reflected portion of the pulse of light 120. For example, the elapsed time between the transmission of the pulse of light 120 and reception of the reflected portion of the pulse of light 120 received by the optical receiver 110 indicates the distance from the time of flight measurement apparatus 100 to the surface 140 according to the following equation:

Distance=(Speed of Light×Elapsed Time)/2      Equation 1

In the instance that the pulse of light 120 is transmitted at an angle to the surface 140, the angle can be measured and the perpendicular distance between the time of flight measurement apparatus 100 and the surface 140 (i.e., slant range) at the point of reflection can be calculated using known trigonometry equations. A scanning subassembly 135, such as including a mirror, prism, holographic optic, and/or pointing device (e.g. a gimbal) for example, can be used to direct the pulse of light 120 toward the surface 140. The scanning subassembly 135 can direct pulses of light to different locations of the surface 140 so as to determine contours and attributes of the surface 140 at different locations. The angle at which the scanning subassembly 135 directs the pulse of light 120 can be measured to provide a scan angle. Alternately, a 2D LIDAR detection array with time of arrival output can also be used in combination with lenses and/or holographic elements to result in a measurement of the angle at which the reflection is received. The scanning subassembly 135 is not necessary in various embodiments and may be excluded from the time of flight measurement apparatus 100.

The circuitry 115 can further include laser control circuitry. The laser control circuitry can be configured to cause the fiber laser 105 to transmit pulses of light at a rapid rate. For example, the rate of light pulse transmission can be at least 1000 pulses of light per second (i.e. 1 kilohertz). More particularly, the rate of light pulse transmission can be more rapid, for example at a rate of 20 kilohertz, 83 kilohertz, or higher rates of light pulse transmission. The circuitry 115 may control any number of fiber lasers 105 or any combination of fiber lasers 105 and other types of lasers for light pulse transmission.

The circuitry 115 can include timing circuitry for determining time of arrival of optical signals. For example, the circuitry 115 can include a CFD. The circuitry 115 can vertically discriminate between the multiple return signals received and determine multiple distances to vertically distinct surfaces. The ability of the circuitry 115 to distinguish between multiple return signals is improved by use of a fiber laser due to the reduced width of the pulses generated by the fiber laser as discussed herein.

The fiber laser 105 includes an optical fiber as an active gain region. The active gain region can include a rare-earth doped element. The rare earth doped element can include erbium, ytterbium, neodymium, and/or other suitable material(s). The fiber laser 105 can transmit light at a wavelength selected based on an eye-safety parameter. For example, the wavelength of the light transmitted by the fiber laser 105 can be between about 1.3 and 1.8 micron. More particularly, the wavelength of the light transmitted by the fiber laser 105 can be about 1.7 micron. Other wavelengths can be used, however. The rangefinding devices disclosed herein can include multiple fiber lasers 105 in each instance where a single fiber laser 105 may be discussed. For example, multiple fiber lasers 105 may be implemented for transmitting pulses of light in succession or simultaneously in-flight.

Use of the fiber laser 105 can result in a consistent pulse shape regardless of the pulse rate. Such consistent pulse shape improves timing for locating a point. Moreover, the fiber laser 105 can produce more power than conventional types of lasers used in laser ranging systems as discussed above. The width of the pulses of light generated by the fiber laser 105 can be narrower than pulses of light generated by conventional rangefinding devices. For example, the width of the pulses of light generated by the fiber laser 105 can be about ten, five nanoseconds, or less. As such, vertical discrimination of multiple reflected portions of a single optical pulse may be increased. As a result, the time of flight measurement device 100 may be operated at greater distances from the surface 140, have increased accuracy and other performance characteristics, the frequency of the light pulses generated can be changed while retaining pulse shape characteristics, and the pulse shape characteristics may also be held more consistent with a larger variation of pulse rate and at higher speeds of pulse rate. For example, the accuracy of the distances measured can be on the order of ten or less centimeters, or five or less centimeters.

Use of the fiber laser 105 can improve eye-safety parameters. For example, the fiber laser 105 can throttle output energy (by gain adjustments) without affecting the pulse shape. Attenuation of the pulse may not be required because the pulse shape is kept consistent over a wider range of pulse rates. Moreover, the wavelength enabled by the fiber laser 105 also improves eye-safety of the time of flight measurement apparatus 100 shown in FIG. 1.

Any method for associating the signals received by the optical receiver 110 with the signals transmitted by the fiber laser 105 can be implemented. These methods of association may be performed at least in part by circuitry 115. For example, the signals can be polarized, and/or sent having differing wavelengths in order to use the polarization, and/or different wavelengths of the signals to associate the signals transmitted by the fiber laser 105 with the return signals.

The circuitry 115 can also include sampling electronics that can continuously record samples received from the receiver 110 along with timing information, such as timestamps, and record the samples along with the timing information for post-processing. The recorded information can be stored and subsequently processed to determine the association between the received pulses and the transmitted pulses and thus derive the distances and/or surface models from the recorded information.

Sampled data can further include waveforms (i.e. intensity profiles). The circuitry 115 can further include an intensity waveform recording device and/or a peak intensity recording device. Any of the devices discussed herein, or other devices known to be commonly combined with a time-of-flight measurement device or certain application, can be combined into a single device (or circuit) or multiple devices (or circuits) with the embodiments incorporating fiber lasers. One embodiment of the waveform recording device may be considered similar to an oscilloscope along with a digital sampling device. The waveform recording device can include circuitry 115 that receives samples from the receiver 110 and records waveform information for real-time analysis and/or post-processing. The intensity recording device can also include circuitry 115 that receives samples from the receiver 110 and records intensity information for real-time analysis and/or post-processing.

The circuitry 115 can include a data processing device for executing instructions stored in memory, for performing calculations, storing and retrieving data from memory, and for performing other tasks disclosed herein. For example, the circuitry 115 can include a conventional or special purpose computer or other device having a processor, memory, and a user interface.

Multiple pulses of light can be transmitted and received in succession, or multiple pulses of light can be simultaneously in-flight as disclosed in U.S. patent application Ser. No. 11/397,246, the contents of which are hereby incorporated by reference herein. As a result, the number of pulses in a given amount of time and corresponding range measurements may be increased over conventional systems.

Use of a fiber laser with such multiple-pulse systems can be of great benefit, particularly when flying at higher altitudes, where the time of flight of any individual laser pulse ordinarily limits the maximum pulse rate that can be obtained. This impact can be significant. For instance, the speed of light limits the maximum pulse rate for a system capable of only serial-ranging operation to approximately 18 kHz at an altitude of 6000 m above ground level (AGL), while 150+ kHz can be obtained at altitudes below 500 m AGL. The result of this embodiment is that the flying height for a given laser pulse rate can be doubled, tripled, etc (depending on the number of pulses being handled simultaneously) or, vice versa, the maximum pulse rate for a given flying height can be doubled, tripled, etc. Moreover, the fiber laser generates pulses having a higher power and consistent waveform at higher speeds. Therefore, a fiber laser is particularly beneficial for generating multiple pulses of light simultaneously in-flight from high altitudes.

Figure 2:
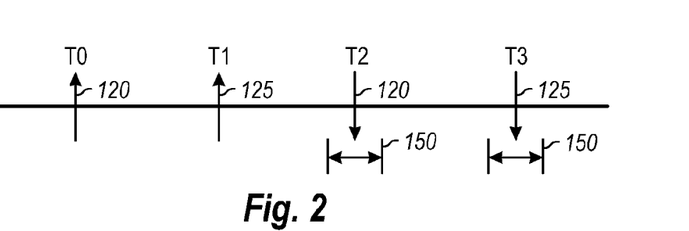
FIG. 2 illustrates a method for transmitting and receiving signals in a laser ranging system.

For example, referring to FIG. 2, a method for transmitting and receiving signals in a laser ranging system is illustrated. The first pulse of light 120 is transmitted at time T0. After the first pulse of light 120 is transmitted at time T0, but before the reflected portion of the first pulse of light 120 is received, a second pulse of light 125 is transmitted at time T1. After the second pulse of light 125 is transmitted at time T1, a reflected portion of the first pulse of light 120 is received at time T2. In such embodiments, the distance between the fiber laser and the surface form which return signals are reflected can be increased beyond what is usable for non-overlapping intervals. However, in some embodiments the rate at which pulses of light are generated may be increased at least as high as 100 kHz, 150 kHz, or higher. Thus, in such embodiments, use of a fiber laser has been found to be particularly advantageous for the various reasons discussed herein. Thus, a system may be capable of overlapping parallel or multi-pulse operation to approximately 36 kHz (or faster) at an altitude of 6000 m AGL, and 150+kHz can be obtained at altitudes of 1000 m AGL (or lower).

Where the distance between a ranging system and a surface is known or can be estimated, it may not be necessary to sample a signal from the optical receiver continuously. Rather, the optical receiver can be sampled during particular intervals 150 (which may also be referred to as "sampling gates") during which the signals are expected to be received. Therefore, return signals may be associated with the proper transmitted signal. Moreover, in some instances a return signal may not be received, for example where the pulse of light is directed away from the optical receiver. In this instance, the signal will not be received in the interval 150 and the likelihood of mistaking noise, interference, or another signal for the return signal can be minimized.

Any method for associating the signals received with the signals transmitted can be implemented. Polarization of the signals may also be implemented to associate transmitted signals with received signals. For example, referring to FIG. 2, signal 120 can have a first polarization and signal 125 can have a different polarization from signal 120. Thus, return signals 120 and 125 received at T2 and T3 can be associated with their transmitted signals sent at T0 and T1 based on the transmitted and received signals' polarization. Other methods of associating transmitted pulses with their corresponding return signals can also be implemented.

Figure 3:
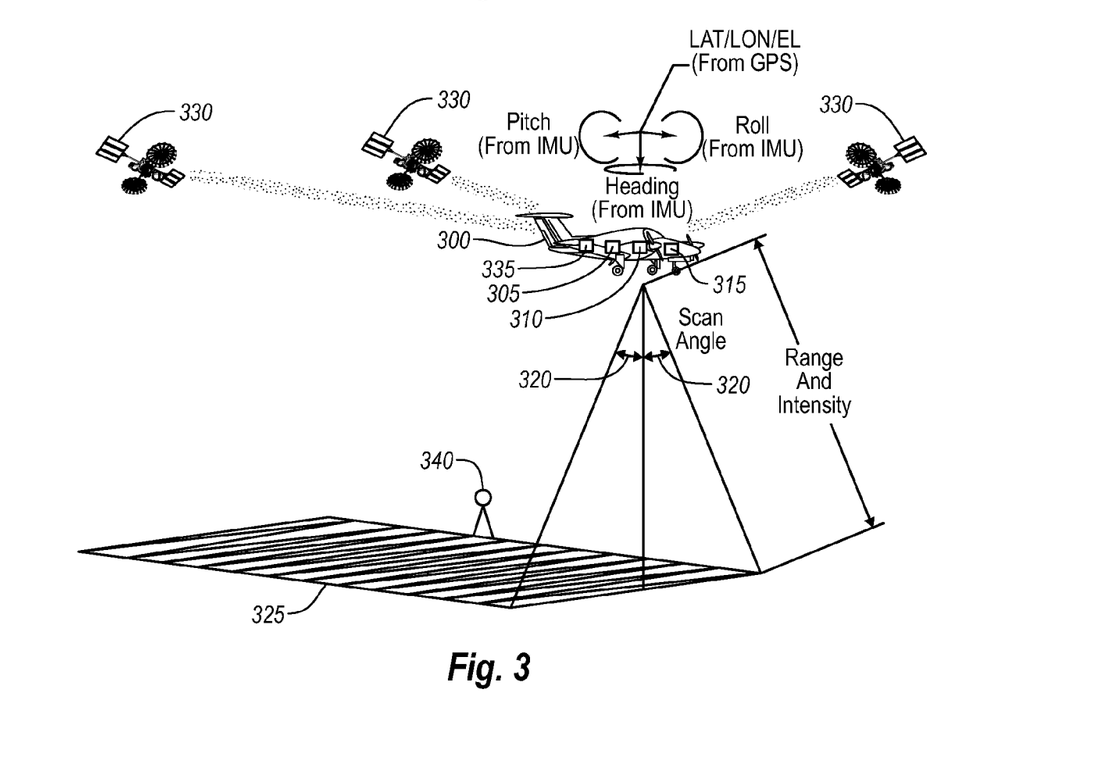
FIG. 3 illustrates a system for collecting topographical information.

Referring to FIG. 3, a time of flight measurement apparatus is illustrated including a system for collecting topographical information. The system includes an aerial platform, in this example an aircraft 300 type of vehicle carrying a LIDAR 305 including a fiber laser, a GPS 310 type of position measurement unit, and an IMU 315 type of orientation measurement unit. The LIDAR 305 is configured to emit pulses of light from a fiber laser and receive return signals, for example see FIG. 1. The pulses of light emitted from the fiber laser of the LIDAR 305 can be emitted at scan angles 320 so as to take range and/or intensity measurements over a portion of a surface 325. The portion of the surface 325 sampled can relate to a scan angle 320 of the LIDAR 205. The scan angle 320 of the LIDAR 205 can be taken into account to determine the contours of the surface 325 and produce a subsequent data model, such as a point cloud, DSM, or DTM, from the data acquired using known trigonometry equations. The LIDAR 305 can yield details under tree cover, "see" at night, and orthorectify imagery (with software).

The GPS 310 can receive signals from multiple satellites 330 and calculate positional data from the signals received from the satellites 330. The GPS can include any position measurement device. The positional data can include latitude, longitude, and elevation data describing a position of the aircraft 300 at a given point in time. The IMU 315 can measure changes in attitude of the aircraft 3200 and can include any orientation measurement device. For example, the IMU 315 can measure changes in pitch, roll, and heading (for example including yaw) of the aircraft 300.

The aircraft can include circuitry 335 for processing the data received from the LIDAR 305, GPS 310, and/or IMU 315 to create a high spatial resolution data model describing the surface 325. For example, as the aircraft 300 flies across a project area including the surface 325, pulses of light are emitted toward the ground at a high rate. These pulses of light are reflected by the surface 325 and/or objects upon the surface 325, such as trees and buildings. For each pulse of light, the elapsed time between the emitted and returning signal is measured, which enables a distance to be computed. At the same time, the position and attitude of the aircraft 300 are measured with the airborne GPS 310 and IMU 315. A GPS ground reference station 340 may also be used for increased accuracy.

In addition to recording the round-trip elapsed time of the pulses of light transmitted by the fiber laser, the intensity of the returned reflections can also be recorded. The intensity information can be mapped in the form of a graphical plot, generated by a process similar to that of an orthophoto. Where a pulse of light encounters more than just the surface 325 it may be reflected by additional objects, such as power cables and trees for example. Additional return signals can be recorded for each pulse of light, generating information about the area sampled. Post processing firmware and/or software implemented in the aircraft, or after a data gathering mission, can also combine the aircraft trajectory and pulse of light scan data to calculate ground coordinates of the data points and transform, if required, to the projection and datum preferred by a user. The handling of time interval measurements from laser pulses propagating through the atmosphere is not limited to detection of discrete single or multiple return reflection pulses occurring during a time interval. Several advantages of using a fiber laser include performance and safety advantages as discussed above. For example, the aircraft 300 may be able to fly at higher altitudes, the pulses of light may have characteristics, such as power, wavelength, and eye-safety characteristics, which may result in several advantages.

Post processing firmware and/or software can combine the data received from the LIDAR 305, GPS 310, and IMU 315 with information describing atmospheric conditions, hardware characteristics, and other relevant parameters, to generate a series of XYZ coordinate triplets (optionally with return signal intensity data) for points on the ground. As a data gathering mission progresses, millions of such points can be captured, providing a DTM.

In one embodiment, the LIDAR 305 can include an airborne laser scanner, such as the Leica ALS50 Airborne Laser Scanner that, according to the teachings disclosed herein, includes a fiber laser to generate pulses for acquisition of topographical and return signal intensity data. The LIDAR 305 can have a maximum 83 kilohertz pulse rate or more generated by one or more fiber lasers, a four-return range detection system, and be configured for flight altitudes of up to 4 kilometers or more. The LIDAR 305 can have automatic adaptive roll compensation, up to a 75 degree or more scan angle, and be integrated with a digital aerial camera.

Figure 4:
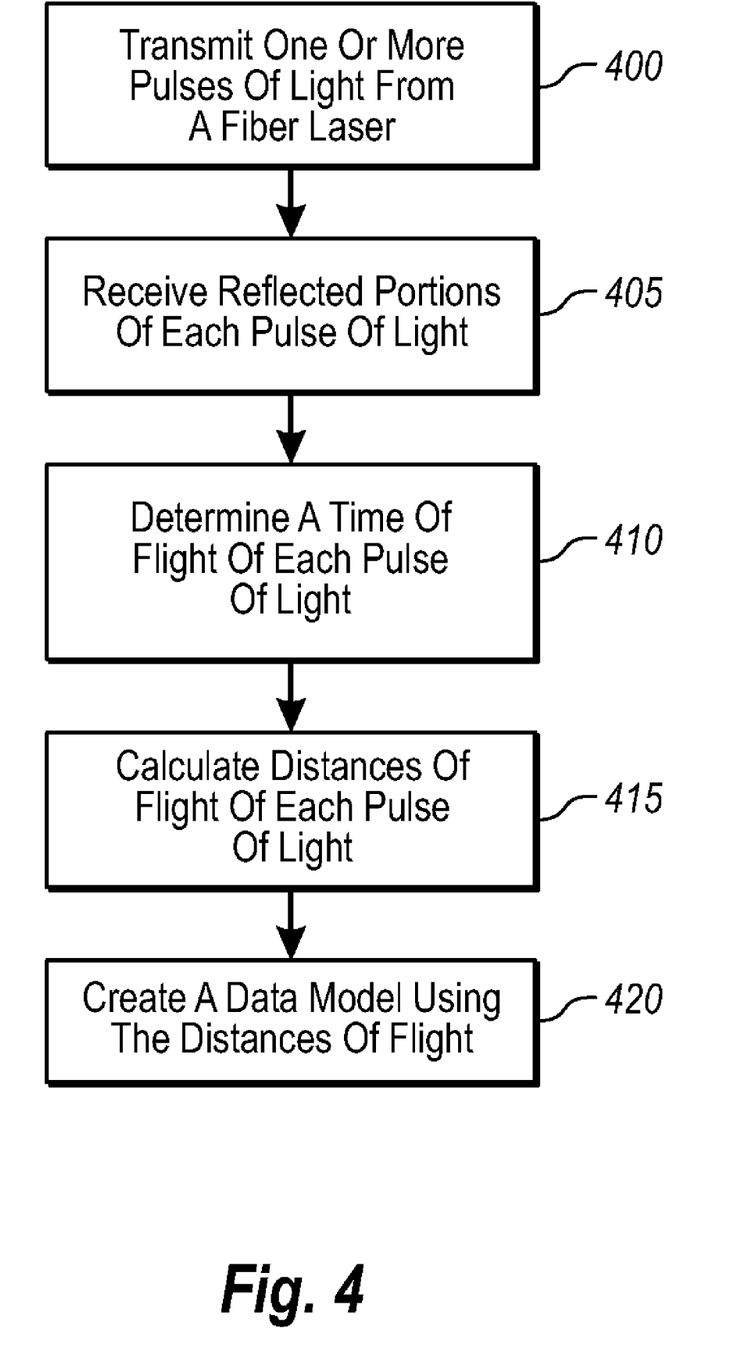
FIG. 4 illustrates a method for creating a data model describing a surface.

Referring to FIG. 4, a method for acquiring data describing a surface is illustrated. One or more pulses of light are transmitted from a fiber laser in rapid succession (400). The pulses of light can have different wavelengths, can be polarized to associate the return signals with the transmitted signals. The pulses of light can each have an associated trajectory and scan angle toward the surface. Pulses can be associated a wavelength selected based on an eye-safety parameter. The one or more pulses of light can be transmitted in rapid succession or be simultaneously in-flight. Return signal representing reflected portions of the transmitted pulses of light are received (405).

Time of flight for each pulse of light is determined (410) by measuring the time elapsed between the transmission of each pulse of light and the time of reception of the reflected portion of each pulse of light. A distance of travel for the pulses of light can be calculated using the time of flight of each pulse of light (415). For example, the distance of travel by each pulse of light can be calculated using Equation 1 above. A data model, such as a point cloud, DSM, or DTM, can be created using the distances of flight (420). The data model can account for slant angles of the first and second pulses of light and include data received from additional pulses of light, for example millions of pulses of light may be used to create the data model.

The pulses of light are transmitted using a fiber laser (or multiple fiber lasers) and the reflected portions of the pulses of light are detected using an optical receiver such as an avalanche photodiode, PIN photodiode, a photomultiplier, a channel multiplier, a vacuum diode, an imaging array with time-of-arrival output, or any other type of optical receiver known to one of ordinary skill in the art.

The fiber laser and receiver can be part of a laser ranging system, for example see FIGS. 1 and 2. The laser ranging system can produce electronic signals describing the transmission and reception of pulses of light. Additional information can be received from a GPS and IMU describing position and attitude of an aerial platform, such as the aircraft shown in FIG. 3, in which the LIDAR, GPS, and IMU are being carried. A point cloud or DTM can be created based at least in part on the data received from the LIDAR, GPS, and IMU.

Embodiments disclosed herein for performing the methods disclosed herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired data and program code means in the form of computer-executable instructions or data structures and which can be accessed by a general purpose, special purpose computer or other data processing device. Computer-executable instructions include, for example, instructions and data which cause circuitry, a general purpose computer, special purpose computer, or other data processing device to perform a certain function or group of functions.

While apparatuses discussed herein have been described in conjunction with applications for gathering information describing surfaces of objects and terrain, it should be appreciated that the apparatuses can be used in various other applications, such as but not limited to, seismology, fault detection, biomass measurement, wind speed measurement, temperature calculation, traffic speed measurement, object identification, atmospheric research, meteorology, distance measurement, as well as many other applications.

A time of flight measurement device apparatus according to the teachings herein can include a laser scanner, such as the laser scanner disclosed in U.S. Pat. No. 6,734,849, the contents of which are incorporated by reference herein, except that a fiber laser is used to transmit light as disclosed herein. A laser scanner, such as that disclosed in U.S. Pat. No. 6,734,849 can be used to collect points to form a point cloud by transmitting pulses of light by a fiber laser and receiving reflected portions of the pulses of light. Each point in the point cloud can represent the distance in a real scene from a point on a surface of an object in the scene to the laser scanner. A computer can display the points as the point cloud on a display, including such devices as a monitor, a projection screen, and stereo glasses. By displaying the points, the computer assigns pixel values based on instructions from software according to well-known principles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A laser ranging system comprising:
   at least one fiber laser configured to transmit pulses of light to a surface at a rate of at least about 20,000 pulses of light per second, each fiber laser including an optical fiber as an active gain region, wherein the active gain region includes a rare-earth doped element;
   laser control circuitry, wherein the laser control circuitry is configured to cause the at least one fiber laser to transmit the pulses of light at the rate of at least about 20,000 pulses of light per second;
   an optical receiver configured to receive return signals comprising portions of the transmitted pulses of light reflected from the surface;
   elapsed time circuitry configured to measure an elapsed time between transmission of at least one transmitted pulse of light by the fiber laser and reception of at least one corresponding return signal;
   a position measurement unit configured to acquire position information corresponding to the position of the laser ranging system;
   an inertial measurement unit configured to acquire pitch, roll, and heading information corresponding to movement of the laser ranging system; and
   a scanning subassembly configured to direct the pulses of light at various scan angles,
   wherein a pulse shape of the pulses of light is held substantially consistent during operation of the laser ranging system.

2. A laser ranging system according to claim 1, further comprising:
   processing circuitry configured to derive a digital model of the surface based at least in part on the measured elapsed time.

3. A laser ranging system according to claim 1, wherein the rare-earth doped element includes erbium, ytterbium, and/or neodymium.

4. A laser ranging system according to claim 1, further comprising circuitry configured to distinguish between multiple return signals corresponding to a single pulse of light reflected from multiple, vertically spaced objects on the surface.

5. A laser ranging system according to claim 1, wherein a width of the pulses generated by the fiber laser enables a vertical discrimination of less than 3.5 meters.

6. A laser ranging system according to claim 1, further comprising processing circuitry that includes a processor configured to calculate a distance between the laser ranging system and the surface based at least in part on each measured elapsed time.

7. A laser ranging system according to claim 1, further comprising sampling electronics configured to receive, from the optical receiver, characteristics of a discrete return pulse, reflection pulses, and/or an entire return reflection pulse waveform.

8. A laser ranging system according to claim 1, further comprising:
   an aerial platform supporting at least the fiber laser, optical receiver, laser control circuitry, elapsed time circuitry, the position measurement unit, the inertial measurement unit, and scanning subassembly.

9. A laser ranging system according to claim 8, wherein the aerial platform includes an airplane or other aircraft.

10. A laser ranging system according to claim 1, wherein a wavelength of the transmitted light is selected based on an eye-safety parameter.

11. A laser ranging system according to claim 10, wherein a wavelength of the transmitted light is between about 1.3-1.8 micron.

12. A laser ranging system according to claim 10, wherein a wavelength of the transmitted light is about 1.5 micron.

13. A laser ranging system according to claim 10, wherein a wavelength of the transmitted light is between about 1.535 and about 1.545 micron.

14. A laser ranging system according to claim 1, wherein the system has an associated maximum pulse rate of at least about 100 kilohertz.

15. A laser ranging system according to claim 1, wherein the system has an associated maximum pulse rate of at least about 150 kilohertz.

16. A laser ranging system according to claim 1, wherein a pulse waveform generated by the fiber laser at a rate of 20 kilohertz is substantially similar to a pulse waveform generated by the fiber laser at a rate of 100 kilohertz.

17. A laser ranging system according to claim 1, wherein the at least one fiber laser is configured to transmit pulses of light at a rate of about 100 kilohertz and the laser control circuitry causes the at least one fiber laser to transmit pulses of light at the rate of about 100 kilohertz.

18. A laser ranging system according to claim 1, wherein the at least one fiber laser is configured to transmit pulses of light at a rate of at least 150 kilohertz and the laser control circuitry causes the at least one fiber laser to transmit pulses of light at the rate of at least 150 kilohertz.

19. A laser ranging system according to claim 1, wherein the laser control circuitry is further configured to cause the fiber laser to transmit a first pulse of light prior to a second pulse of light, the laser control circuitry further configured to cause the fiber laser to transmit the second pulse of light prior to a time at which a reflected portion of the first pulse of light is received by the optical receiver.

20. A laser ranging system according to claim 1, wherein each pulse of light has a pulse width of about ten nanoseconds or less.

21. A laser ranging system according to claim 1, wherein the laser ranging system is capable of overlapping parallel or multi-pulse operation to approximately 36 kHz or faster at an altitude of 6000 m above ground level.

22. A light detection and ranging (LIDAR) system comprising:
   a fiber laser configured to transmit pulses of light to a surface, each pulse of light having a pulse width of about five nanoseconds or less, the fiber laser including an optical fiber as an active gain region;
   laser control circuitry configured to cause the fiber laser to transmit the pulses of light with a pulse width of five nanoseconds or less and with a pulse shape that is held substantially consistent;
   an optical receiver configured to receive return signals reflected from the surface;
   circuitry configured to distinguish between multiple return signals corresponding to a single transmitted pulse of light;
   elapsed time circuitry configured to measure an elapsed time between transmission of at least one pulse of light by the fiber laser and reception of at least one respective return signal;
   circuitry configured to calculate a distance based at least in part on the elapsed time, wherein the distance calculation has a precision of about ten centimeters or less;
   a position measurement unit configured to acquire information associated with a position of the LIDAR system, wherein the position measurement unit is configured to receive signals from multiple satellites and to calculate positional data from the signals received from the satellites, wherein the positional data includes latitude, longitude, and elevation data;

an orientation measurement unit configured to acquire information associated with a pitch, roll, and heading of the LIDAR system, wherein the orientation measurement unit is configured to calculate attitude data of the LIDAR system, the attitude data including heading data, pitch data, and roll data; and a scanning subassembly configured to direct the pulses of light at various scan angles.

23. A LIDAR system according to claim 22, further comprising:

a data processing unit configured to receive range data from the circuitry configured to calculate a distance, the data processing unit further configured to receive pitch, roll, and heading data from the orientation measurement unit, the data processing unit further configured to receive latitude, longitude, and altitude data from the position measurement unit, wherein the data processing unit further includes computer executable instructions stored on a computer readable medium, the computer executable instructions being configured to cause the data processing unit to create a digital terrain model (DTM) describing terrain, or a point cloud describing terrain based at least in part on the data received from the circuitry configured to calculate a distance, position measurement unit, and orientation measurement unit.

24. A LIDAR system according to claim 22, wherein the position measurement unit includes a global positioning system (GPS) and the orientation measurement unit includes an inertial measurement unit (IMU).

25. A LIDAR system according to claim 22, wherein a wavelength characteristic of the transmitted light corresponds with an eye-safety parameter.

26. A LIDAR system according to claim 25, wherein a wavelength of the transmitted light is between about 1.3-1.8 micron.

27. A method for mapping terrain, performing bathymetry, performing seismology, detecting faults, measuring biomass, measuring wind speed, taking ozone measurements, calculating temperature, measuring traffic speed, identifying an object, surveying, performing close range photogrammetry, analyzing the atmosphere, performing meteorology, or measuring a distance, comprising:

using the LIDAR system of claim 22 to map terrain, perform bathymetry, perform seismology, detect faults, measure biomass, measure wind speed, take ozone measurements, calculate temperature, measure traffic speed, identify an object, survey, perform close range photogrammetry, analyze the atmosphere, perform meteorology, or measure a distance.

28. A method for acquiring data describing one or more surfaces, the method comprising:

transmitting pulses of light that are maintained to have a substantially consistent pulse shape from at least one fiber laser at a rate of at least 20,000 pulses of light per second, the fiber laser including an optical fiber as an active gain region;

for at least one transmitted pulse of light, receiving at least one return signal;

for at least one return signal, determining a time of flight of the corresponding pulse of light based at least in part on an elapsed time between the transmission of the pulse of light and reception of the corresponding return signal;

calculating distances between a reference and the one or more surfaces;

receiving a signal associated with a position of the fiber laser;

receiving a signal associated with changes in attitude of the fiber laser; and generating a three-dimensional digital data model using at least the calculated distances between the reference and the one or more surfaces.

29. A method according to claim 28, wherein the pulses of light are transmitted from the at least one fiber laser at a rate of at least 100,000 pulses of light per second.

30. A method according to claim 28, further comprising calculating distances to two surfaces from which a single pulse of light is reflected, wherein the distances calculated have a vertical discrimination between the vertical distance between two surfaces of less than 3.5 meters.

31. A method according to claim 28, wherein the three-dimensional digital data model generated includes a 3.5 meter or less vertical discrimination between surfaces.

32. A method according to claim 28, wherein the pulses transmitted have a width of ten nanoseconds or less.

33. A method according to claim 28, wherein the pulses transmitted have a width of five nanoseconds or less.

34. A method according to claim 28, wherein a waveform of the pulses of light transmitted at 20,000 pulses of light per second is substantially similar to a waveform of the pulses of light transmitted at 100,000 pulses of light per second.

35. A method according to claim 28, wherein the pulses of light are unattenuated.

36. A method according to claim 28, further comprising:
transmitting a first pulse of light;
transmitting a second pulse of light after the first pulse of light is transmitted;
receiving a reflected portion of the first pulse of light after the second pulse of light is transmitted; and
determining a time of flight of the first pulse of light by determining an elapsed time between the transmission of the first pulse of light and the time of reception of the reflected portion of the first pulse of light.

37. A method according to claim 28, wherein the three-dimensional digital data model includes a digital terrain model (DTM), a digital surface model (DSM), or a point cloud model describing the one or more surfaces from which the portions of the pulses of light are reflected.

38. A method according to claim 28, further comprising:
recording information in a computer readable medium, the information describing a discrete return reflection pulse, multiple reflection pulses, or an entire return reflection pulse waveform.

39. A method according to claim 28, further comprising:
performing an analysis of a waveform of the at least one return signal.

40. A laser ranging system according to claim 1, wherein the pulse shape of pulses of light is held substantially consistent over a range of pulse rates and pulse energies.

41. A LIDAR system according to claim 22, wherein the pulse shape of pulses of light is held substantially consistent over a range of pulse rates and pulse energies.

42. A method according to claim 28, wherein the transmitted pulses of light are maintained to have a substantially consistent pulse shape over a range of pulse rates and pulse energies.

* * * * *